(12) United States Patent
Manovit et al.

(10) Patent No.: US 8,898,401 B2
(45) Date of Patent: Nov. 25, 2014

(54) METHODS AND APPARATUSES FOR IMPROVING SPECULATION SUCCESS IN PROCESSORS

(75) Inventors: Chaiyasit Manovit, Mountain View, CA (US); Paul Nicholas Loewenstein, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 847 days.

(21) Appl. No.: 12/266,753

(22) Filed: Nov. 7, 2008

(65) Prior Publication Data

US 2010/0122038 A1     May 13, 2010

(51) Int. Cl.
*G06F 12/00* (2006.01)
*G06F 9/46* (2006.01)
*G06F 9/52* (2006.01)
*G06F 12/12* (2006.01)
*G06F 12/08* (2006.01)

(52) U.S. Cl.
CPC .............. *G06F 12/127* (2013.01); *G06F 9/528* (2013.01); *G06F 12/0842* (2013.01)
USPC .......................................... 711/154; 707/703

(58) Field of Classification Search
CPC ................ G06F 9/52–9/528; G06F 17/30008; G06F 2201/87; G06F 2221/0797
USPC .................. 711/137, 144–145, 156
See application file for complete search history.

(56) References Cited

U.S. PATENT DOCUMENTS

| | | | |
|---|---|---|---|
| 5,887,166 A | 3/1999 | Mallick et al. | |
| 5,974,507 A | 10/1999 | Arimilli et al. | |
| 6,282,617 B1 | 8/2001 | Tirumala et al. | |
| 6,408,364 B1 | 6/2002 | Tan et al. | |
| 6,523,092 B1 | 2/2003 | Fanning | |
| 6,594,728 B1 | 7/2003 | Yeager | |
| 6,718,839 B2 | 4/2004 | Chaudhry et al. | |
| 6,825,848 B1 | 11/2004 | Fu et al. | |
| 7,225,299 B1 | 5/2007 | Rozas et al. | |
| 7,721,048 B1 | 5/2010 | Sendag et al. | |
| 2002/0144101 A1 | 10/2002 | Wang et al. | |
| 2002/0174304 A1 | 11/2002 | Wang et al. | |
| 2003/0033510 A1 | 2/2003 | Dice | |
| 2004/0154012 A1 | 8/2004 | Wang et al. | |
| 2004/0162948 A1 | 8/2004 | Tremblay et al. | |
| 2006/0179174 A1 | 8/2006 | Bockhaus et al. | |

(Continued)

OTHER PUBLICATIONS

Non-Final Office Action regarding U.S. Appl. No. 12/266,719, Oct. 26, 2011.

(Continued)

*Primary Examiner* — April Y Blair
*Assistant Examiner* — Nicholas Simonetti
(74) *Attorney, Agent, or Firm* — Polsinelli PC

(57) ABSTRACT

Methods and apparatuses are disclosed that allow for improved speculation success in execute ahead microprocessors. In some embodiments, the method may include speculatively executing a first thread of a program code while a second thread of the program code is executing, determining if a load request is serviceable from a cache line within a cache, and in the event that the load request is serviceable from the cache line, associating a first indicator bit with the cache line. The method also may include determining whether the cache line associated with the first indicator bit has been evicted, and in the event that the cache line is evicted, allowing speculative execution of the first thread to continue.

20 Claims, 4 Drawing Sheets

(56) References Cited

U.S. PATENT DOCUMENTS

| | | | |
|---|---|---|---|
| 2006/0200632 A1* | 9/2006 | Tremblay et al. | 711/141 |
| 2007/0073693 A1* | 3/2007 | Harris et al. | 707/8 |
| 2007/0094450 A1* | 4/2007 | VanderWiel | 711/133 |
| 2007/0186053 A1 | 8/2007 | Chaudhry et al. | |
| 2007/0186056 A1* | 8/2007 | Saha et al. | 711/144 |
| 2009/0083488 A1 | 3/2009 | Madriles Gimeno et al. | |
| 2009/0106538 A1 | 4/2009 | Bishop et al. | |
| 2012/0079246 A1 | 3/2012 | Breternitz, Jr. et al. | |

OTHER PUBLICATIONS

Amendment and Response to Non-Final Office Action regarding U.S. Appl. No. 12/266,719, Jan. 26, 2012.

Final Office Action regarding U.S. Appl. No. 12/266,719, Apr. 23, 2012.

Amendment and Response to Final Office Action regarding U.S. Appl. No. 12/266,719, Jul. 23, 2012.

Response to Final Office Action regarding U.S. Appl. No. 12/266,719, Sep. 20, 2013.

Advisory Action Before the Filing of an Appeal Brief regarding U.S. Appl. No. 12/266,719, Sep. 30, 2013.

Response to Final Office Action regarding U.S. Appl. No. 12/266,719, Oct. 21, 2013.

Non-Final Office Action regarding U.S. Appl. No. 12/266,719, Dec. 11, 2013.

Response to Non-Final Office Action regarding U.S. Appl. No. 12/266,719, Mar. 11, 2014.

Notice of Allowance regarding U.S. Appl. No. 12/266,719, Apr. 1, 2014.

Final Office Action regarding U.S. Appl. No. 12/266,719, Feb. 14, 2013.

Final Office Action regarding U.S. Appl. No. 12/266,719, Jun. 20, 2013.

* cited by examiner

METHODS AND APPARATUSES FOR IMPROVING SPECULATION SUCCESS IN PROCESSORS

CROSS-REFERENCE TO RELATED APPLICATIONS

This application is related to U.S. Nonprovisional patent application Ser. No. 12/266,719, entitled "Methods and Apparatuses for Improving Speculation Success in Processors," filed on the same date as the instant application and incorporated by reference as if set forth in full below.

BACKGROUND

Computers are ubiquitous in today's society. They come in all different varieties and can be found in places such as automobiles, the grocery store, banks, personal digital assistants, cell phones, as well as in many businesses. As will be appreciated by almost anyone owning a computer, there is a trend of incorporating more and more functionality into the same amount of space. This trend may be due to many factors, such as, the miniaturization and increasing density of system components with each successive generation of computer. These increases in functionality in successive generations of computers may cause inefficiencies in the way that computers operate.

One problem associated with the ever increasing functionality of computers is the disparity between the speed at which the computer's microprocessor operates versus the computer's memory access speed. Because of this disparity, computer's with high speed microprocessors may spend a large amount of time waiting for memory references to complete instead of performing computational operations. Some microprocessors attempt to overcome this disparity by implementing multi-threading. With proper hardware support, multi-threading can dramatically increase the performance of applications. However, as microprocessor performance continues to increase, the time spent synchronizing threads may become a large fraction of overall execution time. These synchronization efforts include locking data being accessed by one thread, so that other threads cannot manipulate data in use by another thread. As the number of threads increases, so does the overhead associated with implementing data locking, so it may be desirable to maximize the performance of each thread so that the number of threads requiring synchronization may be minimized.

To improve the performance of each thread, "speculative" execution may be implemented on one or more sections of the code prior to its occurrence in the program order—i.e., executed ahead of time. In brief, speculative execution may include executing sections of code ahead of time without immediately committing the changes to the microprocessor's architectural state. The changes made during the speculative execution later may be committed to the architectural state of the microprocessor if the speculative execution completes without encountering an interfering data access from another thread. If an access occurs that does not interfere with data in use by another thread, the speculative execution may succeed and results of the speculative execution may be committed to the architectural state of the processor. On the other hand, if an access occurs that does interfere with data in use by another thread, the speculative execution may fail, resulting in the speculative execution not being committed to the architectural state of the processor. Although terminating the speculative execution in this manner may prevent threads from interfering with each other, there may be situations where this termination is premature. For example, there may be subsequent load operations that will not interfere with data in use by another thread yet their execution still may be terminated. Hence, a method and apparatus for improving speculation success in execute ahead microprocessors is desired.

SUMMARY

Methods and apparatuses are disclosed that allow for improved speculation success in execute ahead microprocessors. In some embodiments, the method may include speculatively executing a first thread of a program code while a second thread of the program code is executing, determining if a load request is serviceable from a cache line within a cache, and in the event that the load request is serviceable from the cache line, associating a first indicator bit with the cache line. The method also may include determining whether the cache line associated with the first indicator bit has been evicted, and in the event that the cache line is evicted, allowing speculative execution of the first thread to continue.

Some embodiments may include a computer system comprising a plurality of processing cores. Each core may be capable of executing at least one thread of program code, and each of the cores within the plurality may comprise a plurality of register files and a cache coupled to the plurality of register files, wherein each cache line within the cache further may comprise a first indicator bit. A first core within the plurality of processing cores may execute a first thread of the program code out-of-order code while a second core within the plurality of processing cores may execute a second thread of program code, and in the event that a load request from the first thread hits to a cache line with the first indicator bit set, and that hit cache line is later evicted from the cache, the first thread may continue to execute the program code out-of-order.

Some embodiments may include a tangible storage medium comprising instructions, the instructions may comprise speculatively executing a first thread of a program code while a second thread of the program code is executing, determining if a load request is serviceable from a cache line within a cache, and in the event that the load request is serviceable from the cache line, associating a first indicator bit with the cache line. The method also may include determining whether the cache line associated with the first indicator bit has been evicted, and in the event that the cache line is evicted, allowing speculative execution of the first thread to continue.

BRIEF DESCRIPTION OF THE DRAWINGS

For a detailed description of the various embodiments of the invention, reference will now be made to the accompanying drawings, in which.

The use of the same reference symbols in different drawings indicates similar or identical items.

DETAILED DESCRIPTION

Speculation may allow a multi-threaded processor to execute program code out-of-order so as to minimize idle time. While conventional multi-threaded processors that implement speculation may terminate speculation when a cache conflict occurs, this termination may be overly conservative. In some embodiments, methods and apparatuses may be provided that improve speculation success in execute ahead processors by allowing the speculation to continue even after speculatively read cache lines have been evicted during speculation. Thus, the processor may continue to speculatively execute code out-of-order in a secondary speculative execution state.

Figure 1:
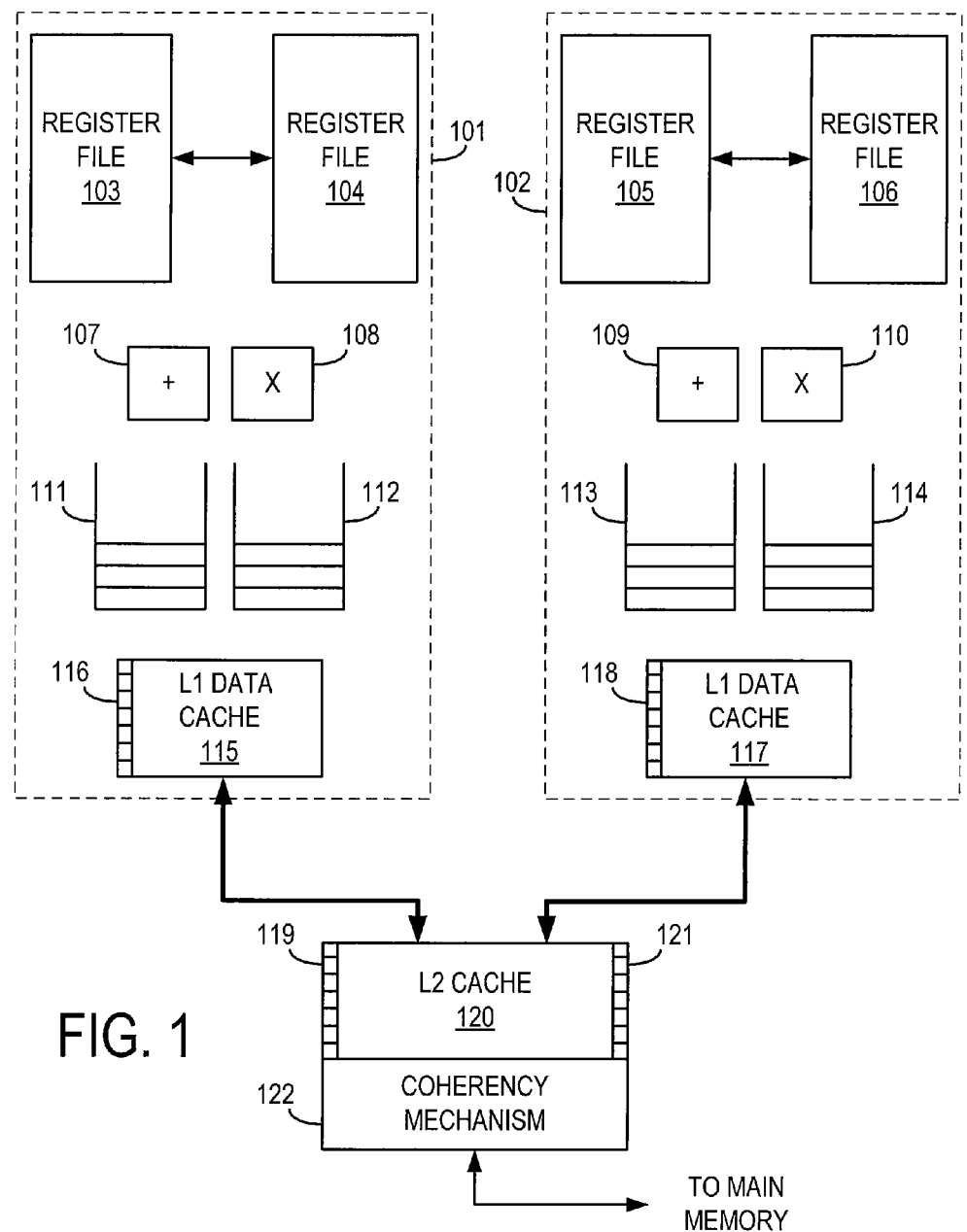
FIG. 1 illustrates an exemplary computer system.

FIG. 1 illustrates an exemplary computer system 100. Computer system 100 may include any type of computer system, including, but not limited to, a computer system based on a microprocessor, a mainframe computer, a digital signal processor, a portable computing device, a personal organizer, a device controller, and/or a computational engine within an appliance to name but a few. As is illustrated in FIG. 1, the computer system 100 may include any number of processors such as the processors 101 and 102, which may couple to a level 2 (L2) cache 120. The L2 cache 120 may be further coupled to a main memory (not specifically shown). Although the computer system 100 may include any number of processors (such as the processors 101 and 102), the processors in the computer system 100 may operate in a similar manner as the processor 101, and therefore, only processor 101 will be described below.

Processor 101 may include a plurality of register files 103 and 104, one of which may be referred to as an "active register file" and the other of which may be referred to as a backup "shadow register file". Note that either of the register files 103 or 104 may be used as the active register file, wherein the other register may be used as the shadow register file. During operation, the processor 101 may provide a flash copy operation that instantly copies all of the values from the register file 103 into the register file 104 or vice versa, wherein the active register contents may be copied to the shadow register file. By providing a flash copy operation in this manner, the computer system 100 may allow snapshots or checkpoints of its operations to be taken at various times in order to support speculative execution.

In other words, if the processor 101 enters a speculative execution mode where it is executing program code out-of-order with respect to its program order, prior to entering this speculative execution mode, the processor may provide a flash copy of the contents of the active register to the shadow register. Thus, if for some reason the speculative execution fails (e.g., cache line invalidation by processor 102), the processor 101 may return to the state that it was in prior to speculative execution mode.

The processor 101 also may include one or more functional units, such as an adder 107 and a multiplier 108. These functional units may be used in performing computational operations involving operands retrieved from the register files 103 or 104. Although not specifically shown, any variety of arithmetic and/or logical operations may be performed by the one or more functional units. Furthermore, as will be described in more detail below, the processors may share one or more of these functional units.

As the processor 101 executes load and store operations, they may pass through a load buffer 111 and a store buffer 112 respectively. The load buffer 111 and store buffer 112 may couple to a level one (L1) data cache 115, which may store data items that are likely to be used by processor 101 while it is executing the program code. Since the computer system 100 may include multiple processors 101 and 102, each of which may be speculatively executing different sections of the program code at different times, data that is currently being loaded and/or stored by one processor may affect data that is about to be or has been loaded and/or stored by another processor. In other words, the load value in the active register may be different from that in the data caches in the computer system 100. This is so because the data caches may be updated with a newer value after the active register files receive the old value from the data caches. Accordingly, each cache line in L1 data cache 115 may include one or more load-marking bits 116 that indicate a data value from any particular cache line has been loaded during speculative execution. For ease of discussion, the load-marking bits 116 will be referred to herein as the speculation bit (S-bit). These S-bits 116 may be used to determine whether any interfering memory references take place during speculative execution as will be described below with reference to FIGS. 2-4. (Although not specifically shown, the processor 101 also may include an L1 instruction cache.)

Note that the load-marking may occur at any stage of memory within the computer system 100, and is not exclusive to the L1 data cache 115. Thus, load-marking can take place at any level cache, such as the L2 cache 120, or even in an independent structure. For the sake of discussion, the load-marking discussed herein will refer to load-marking at the cache level that is as close to the processor as possible, which in this case is the L1 data cache 115.

The L2 cache 120 may operate in concert with the L1 data cache 115 (and/or a corresponding L1 instruction cache) in the processor 101, and with the L1 data cache 117 (and/or a corresponding L1 instruction cache) in the processor 102. In some embodiments, the L2 cache 120 may be associated with a coherency mechanism 122. During operation, this coherency mechanism 122 may maintain "copyback information" 121 for each cache line. This copyback information 121 may facilitate sending a cache line from the L2 cache 120 to a requesting processor in cases where a cache line is to be sent to another processor.

As illustrated, each line in the L2 cache 120 may include a "store-marking bit" 119 to indicate that a data value has been stored to the line during speculative execution. As was the case for the S-bit 116, there may be different versions of the data within different L2 data caches in the computer system 100, and therefore, this store-marking bit 119 may be used to determine whether any interfering memory references take place during speculative execution. Akin to the load-marking, the store-marking does not necessarily have to take place in the L2 cache 120. In some embodiments, the store-marking takes place in the cache level closest to the processor where cache lines are coherent. If the L1 data cache 115 is a write-through cache, writes may be automatically propagated to the L2 cache 120. On the other hand, if the L1 data cache 115 is a write-back cache, the store-marking may be performed in the L1 data cache 115.

The overall speed that the computer system 100 executes the program code may be increased by allowing the different processors (e.g., the processors 101 and 102) to utilize their idle time by speculating as to the eventual outcome of program code in an out-of-order fashion. In some embodiments, the processors 101 and 102 may share at least some of their circuitry with each other, such as the functional units 107 and 108 or the caches 115 and 117. The term "thread", as used herein, generally refers to a processor executing code while sharing components with other processors within the computer system 100. Thus, the processor 101 may execute a first thread or section of program code while the processor 102, which may be sharing components with the processor 101, may execute a second thread.

Figure 2:
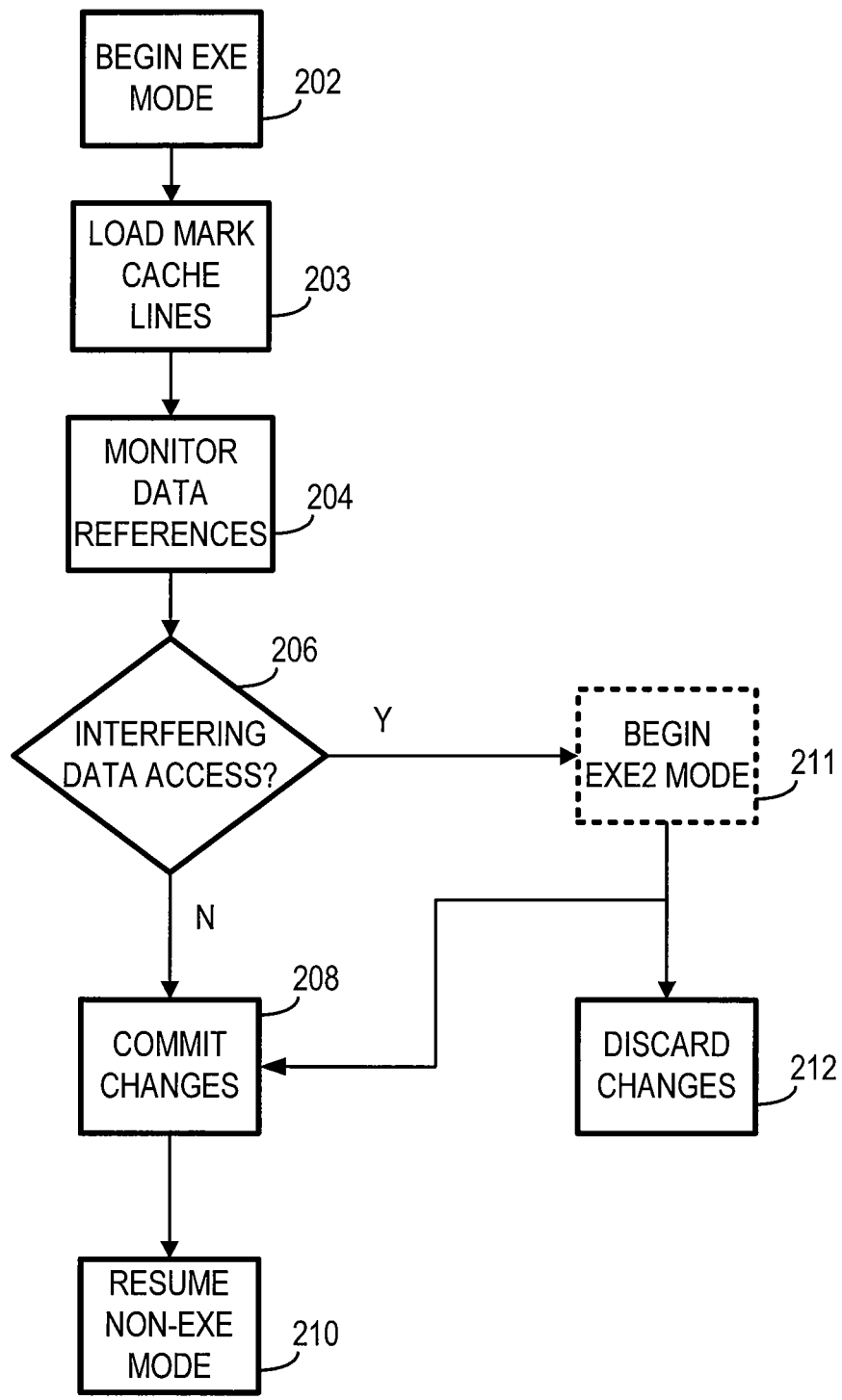
FIG. 2 illustrates a flow chart of speculative execution.

These threads may speculatively execute sections of program code in a speculative execution (EXE) mode as shown in FIG. 2. In block 202, a thread first may begin EXE mode on a section of code without committing results of the speculative execution. For example, during block 202, a flash copy operation may be performed from the register file 103 to the register file 104 (shown in FIG. 1). This flash copy also may checkpoint various state registers associated with the currently executing thread. In general, the flash copy operation checkpoints enough state information to be able to restart the corresponding thread. While the register file 103 is checkpointed, the store buffer 112 may be "gated". Gating the store buffer 112 may allow existing entries in the store buffer 112 to propagate to the memory sub-system (and to thereby become committed to the architectural state of the computer system 100), but may prevent new store buffer entries generated during speculative execution from doing so.

During block 203, the computer system 100 may begin load-marking cache lines. (The computer system 100 also may store-mark cache lines during block 203, however, this disclosure will focus on the methods and apparatuses of increasing speculative execution for load operations.) When performing a load operation during EXE mode, if the load causes a cache hit in the L1 data cache 115, then the computer system 100 "load-marks" the corresponding cache line in L1 data cache 115 by setting the S-bit 116. This load-marking may indicate that that particular cache line is being used during EXE mode.

In block 204, the computer system 100 operating in EXE mode may continually monitor data references made by other threads, and determine if an interfering data access (or other type of failure) has occurred during speculative execution. In some cases, an interfering data access may be a store to a cache line that has already been load-marked by another thread. For example, if a first thread that is speculatively loading data from the L1 data cache 115, it may set the S-bit 116. In this example, if a second thread attempts to store to this same cache line, this may create an interfering data access that causes the EXE mode to fail because the data read by the first thread may no longer conform with in-order execution of the program.

If no interfering data access has occurred during EXE mode (block 206), the computer system 100 may atomically commit all changes made during EXE mode to the architectural state of the computer system 100, per block 208, and then may resume normal non-EXE mode of the program, per block 210.

On the other hand, in conventional systems, if an interfering data access is detected, the computer system 100 may discard changes made during the speculative execution and not commit the changes made during EXE mode to the architectural state of the computer system 100, per block 212. During block 212, the computer system 100 first may discard the register file changes made during the speculative execution. This may involve either clearing or ignoring register file changes made during speculative execution. Because the old register values were checkpointed prior to commencing speculative execution, this may involve copying the shadow register file contents back to the active register file. The computer system 100 also may clear load-marks from cache lines in the L1 data cache 115 and may drain store buffer entries generated during speculative execution without committing them to the memory hierarchy.

Notwithstanding the operations of block 212, in some embodiments, the speculative execution of load operations may be improved by allowing speculative execution to continue even after conventional systems exit EXE mode because of interfering data accesses. Execution after failure of EXE mode is referred to herein as a secondary speculative execution mode (EXE2) and may occur prior to block 212 and/or block 208 in block 211. In other words, EXE2 mode may allow the possibility of changes, made during EXE and/or EXE2 mode, to be committed rather than discarded.

Figure 3:
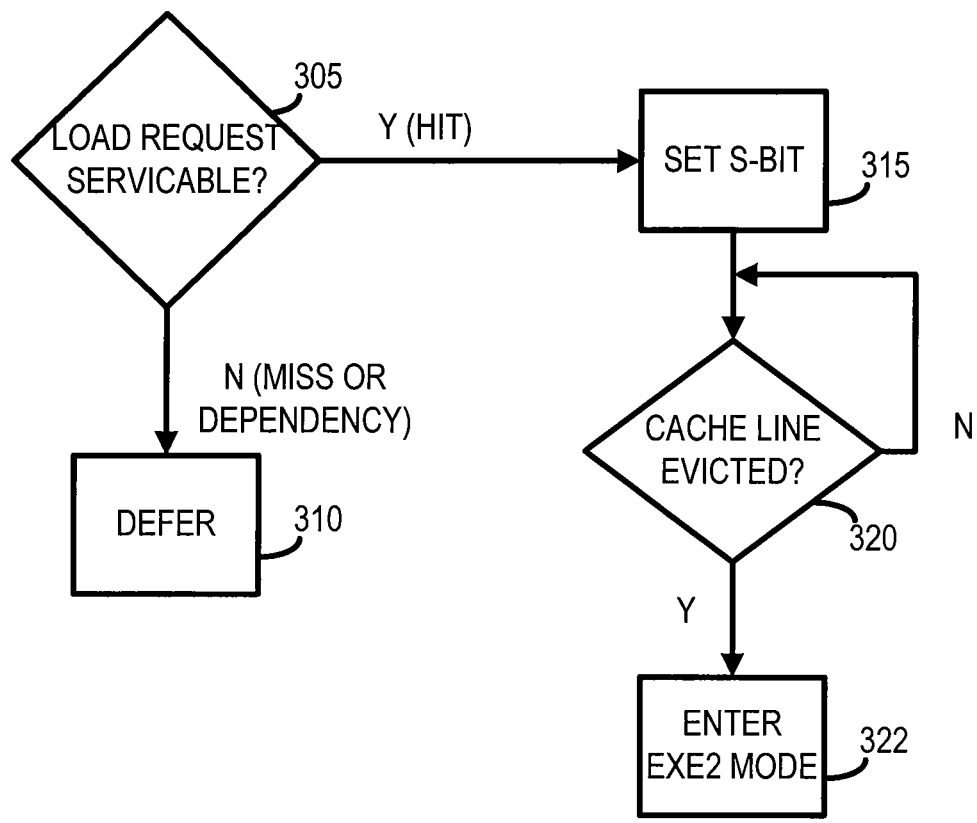
FIG. 3 illustrates a flow chart of processing load requests during speculative execution.
Figure 4:
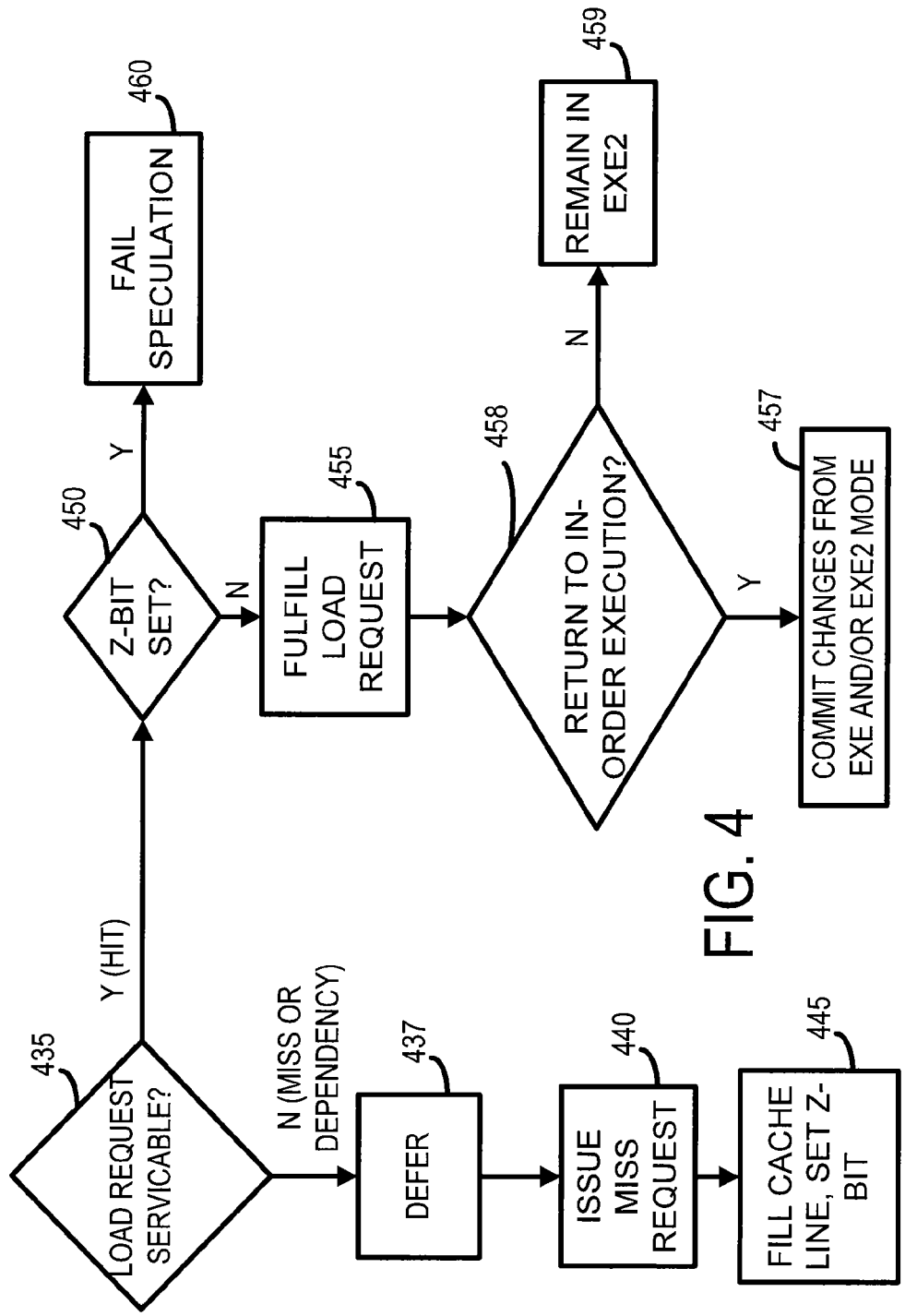
FIG. 4 illustrates a flow chart of processing load requests during a secondary speculative execution.

FIGS. 3 and 4 illustrate exemplary operations as the computer system 100 transitions between EXE mode and EXE2 mode. In block 305, a thread may determine if the requested data is serviceable within its cache. In other words, if the requested data is serviceable then it may be located in the cache and also may not be under some kind of deferment condition. For example, the requested data may not be serviceable from the cache if the load request is subject to an unresolved dependency. If the requested data is not serviceable then the load request may be deferred per block 310. The load request also may be deferred (per block 310) if the load request cannot be fulfilled because of a dependency situation. For example, the load request may load data conditionally from a register A within the register file 103 if register B within the register file 103 is equal to a certain value. If the value of register B is indeterminate when the load register A instruction is speculatively executed, then this conditional load may be deferred until the value of register B is known.

On the other hand, if the load request is within the cache—i.e., a cache hit—then the S-bit 116 for that particular cache line may be set to indicate that the data is in use during EXE mode. If another thread causes the cache line to be evicted while the S-bit 116 is set, conventional systems may terminate EXE mode conservatively because the data in the cache line may no longer represent the same value as if the program code were executed in normal program order. Unfortunately, since the operations that occur during speculative execution may be atomically committed to the architectural state of the computer system 100 at the conclusion of the thread, terminating EXE mode in this manner also may discard speculative loads hitting cacheline entries that were present in the cache line prior to the cache line eviction. In some embodiments, the computer system 100 may transition to EXE2 mode (block 322) instead of terminating the speculation. This may allow such load hits to be committed to the architectural state notwithstanding the eviction of a cache line with S-bit set. Since these loads may already be considered to have committed upon the EXE-to-EXE2 transition, their values cannot have changed because there had been no prior cache line evictions. Therefore, committing load hits (from EXE and/or EXE2 mode) to the architectural state of the computer system 100 at the conclusion of the EXE2 mode instead of failing speculative execution may preserve load hits that otherwise would have been discarded (see e.g., block 455 in FIG. 4). Furthermore, once the speculative executions have been committed at the end of EXE and/or EXE2 mode, the processor 101 may resume normal non-EXE mode of the program (shown in block 210).

During EXE2 mode, whether or not the S-bit 116 is set is no longer relevant. Thus, after the cache line has been invalidated and the computer system 100 has entered EXE2 mode, the S-bits 116 may be cleared as part of transitioning to EXE2 mode in block 322

FIG. 4 illustrates an exemplary scheme for processing load requests during EXE2 mode. In block 435, a thread may determine if the requested data is serviceable from its cache during EXE2 mode. If the data is not serviceable, the computer system 100 may be deferred per block 437, for example because of an unresolved dependency. After the deferment of block 437, such as by clearing up the unresolved dependency, the computer system 100 may issue a miss request per operation 440 if the data is not present in the cache. This may involve the thread requesting the missing data from the L2 cache 120. As the miss request is fulfilled out of the L2 cache 120, the L1 data cache 115 may be filled and the thread may set a bit (referred to as "Z-bit") indicating that the cache line was filled during EXE2 mode. Note that the Z-bit also may be set for cache fills resulting from cache miss requests pending at the time of the EXE-to-EXE2 transition. This is shown in block 445. Since data that fills cache lines during EXE2 mode was not present at the beginning of EXE mode, speculatively executing on this during EXE2 mode may be irrelevant. Thus, if a load request is in the L1 data cache 115 during EXE2 mode, then it may be determined whether the Z-bit was set for that cache line.

If the Z-bit was not set for the cache line that generated the hit, the load request may be fulfilled from the L1 data cache 115 per block 455. Thus, speculative execution may continue if the load request that is in the L1 data cache 115 was present prior to entering the EXE2 mode. Once the load request has been fulfilled, the computer system 100 may return to in-order execution by committing changes from EXE and/or EXE2 mode as shown in block 457. Committing the changes from EXE and/or EXE2 mode complies with the theory of speculative execution where loads are atomically committed at or before the termination of the speculative execution. Otherwise, if the computer system 100 may continue out-of-order execution in EXE2 mode as shown in block 459.

If, however, the Z-bit was set for the cache line that generated the hit, this may indicate that the cache line was filled during EXE2 mode, and therefore, this data is inappropriate for speculative execution purposes (e.g., the data may have been modified after the EXE-to-EXE2 transition). Accordingly, if the thread determines that the load request was fulfilled from a cache line that was filled during EXE2 mode, then the thread fails speculation per block 460. At this point, the computer system 100 may discard changes made during the speculative execution and not commit the changes made during EXE2 and EXE. Notably, this also complies with the theory of speculative execution in that failing loads are not committed to the architectural state of the computer system 100 at the termination if speculative execution fails. Since a pending load miss request may imply that the Z-bit will be set when the load is eventually fulfilled, a thread in EXE2 mode may fail its speculation immediately upon encountering a load miss request from its own thread.

Tables 1 and 2 below illustrate pseudocode that may be executed by the computer system 100 embodied with three processors PROC1, PROC2, and PROC3, where each of the three processors may be capable of executing program code out-of-order so as to maximize computing activity of the computing system 100. The memory locations A and B used in TABLES 1 and 2 are arbitrary cacheable memory addresses that may be located within the various levels of memory.

TABLE 1 illustrates an exemplary pseudocode where PROC3 is speculatively executing instructions from the program code out-of-order in EXE mode. In TABLE 1, locations A and B initially may be equal to zero, and both locations A and B may be present in PROC3's cache. As will be appreciated from review of TABLE 1, speculative execution past EXE mode may occur despite eviction of a cache line with S-bit set—i.e., speculative execution may continue in EXE2 mode.

TABLE 1

| STAGE | PROC1 | PROC2 | PROC3 |
|---|---|---|---|
| 1 | | | LD [B] % r0 |
| 2 | | | LD [A] % r1 |
| 3 | ST 01h [A] | | |
| 4 | | LD [A] % r0 | |
| 5 | | | LD [B] % r0 |
| 6 | | ST % r0 B | |
| 7 | | | JOIN |

Reference will now be made to TABLE 1 in conjunction with FIGS. 3 and 4. In the first stage of execution, PROC3 may attempt to load the contents of location B into register % r0. The location B is in PROC3's cache in this situation, however, the load request may not be ready to execute for a variety of reasons. For example, the load request may involve resolving an unresolved dependency in order to complete execution. Thus the LD [B] % r0 instruction may be deferred per block 310 of FIG. 3.

In the second stage of execution, PROC3 may attempt to load the contents of location A into register % r1, which may generate a cache hit. Since PROC3 is in EXE mode, this cache hit may set the S-bit 116 per block 315. Setting the S-bit 116 in this manner may indicate to the other portions of the computer system 100 that the cache line where location A is stored is being used by PROC3 during speculative execution.

In the third stage of execution, PROC1 may store a value (e.g., 01h) to location A. As a result of this storage by PROC1, location A may be evicted from PROC3's cache. Instead of failing speculation altogether, some embodiments may enter in EXE2 mode, invalidate the cache line for which the S-bit 116 was set, and clear the S-bit 116. In some embodiments, the cache line for A may be updated with new data instead of being invalidated, and therefore, the Z-bit may be set for A in this situation.

In the fourth stage of execution, PROC2 loads the value at location A into register % r0. At the end of the fourth execution stage PROC3 is in EXE2 mode. In the fifth stage of execution, PROC3 loads the value from location B to register % r0. Note that the S-bit 116 is not set here because PROC3 is no longer in EXE mode. Rather, PROC3 is in EXE2 mode, and with no Z-bit set the load request may be fulfilled (block 455).

In the sixth execution stage, register % r0 may be stored into location B, causing the corresponding cache line in PROC3 to be invalidated but without checking the S-bit 116. Next, in the seventh execution stage, PROC3 may join its speculative execution to the in-order execution and commit the changes to the architectural state of the computer system 100. Without implementing the EXE2 mode, PROC3 would have failed the speculation in the third execution stage.

TABLE 2

| STAGE | PROC1 | PROC2 | PROC3 |
|---|---|---|---|
| 1 | | | LD [B] % r0 |
| 2 | | | LD [A] % r1 |
| 3 | ST 01h [A] | | |
| 4 | | LD [A] % r0 | |
| 5 | | ST % r0 B | |
| 6 | | | LD [B] % r0 |
| 7 | | | LD [B] % r0 |

Reference will now be made to TABLE 2 in conjunction with FIGS. 3 and 4. In TABLE 2, PROC3 may be in EXE mode where it is speculatively executing instructions from the program code out-of-order. Also, memory locations A and B initially may be equal to zero, and location A may be present in PROC3's cache, whereas it may be indeterminate as to whether location B is present in PROC3's cache. As will be appreciated from review of TABLE 2, the speculative execution operations of EXE and/or EXE2 modes may not generate bad data values from speculative execution.

In the first stage of execution, PROC3 may attempt to load the contents of location B into register % r0, and that load may be deferred per block 310 of FIG. 3 because the location B is not present in PROC3's L1 data cache or because there is an unresolved dependency with regard to location B. In the second stage of execution, PROC3 may attempt to load the contents of location A into register % r1, which may generate a cache hit. Since PROC3 is in EXE mode, this cache hit may set the S-bit 116 per block 315. Setting the S-bit 116 in this manner may indicate to the other portions of the computer system 100 that the cache line where location A is stored is being used by PROC3 during speculative execution.

In the third stage of execution, PROC1 may store a value (e.g., 01h) to location A. As a result of this storage by PROC1, location A may be evicted from PROC3's cache. Instead of failing speculation altogether, some embodiments may enter in EXE2 mode, invalidate the cache line for which the S-bit 116 was set, and clear the S-bit 116. In some embodiments, the cache line for A may be updated with new data instead of being invalidated, and therefore the Z-bit may be set for A in these situations.

In the fourth stage of execution, PROC2 loads the value at location A into register % r0. In the fifth stage of execution, PROC2 stores a value in register % r0 (e.g., 01 h) to location B. If location B is present in PROC3's cache, it will be invalidated (or updated in some embodiments) but its S-bit will not be checked because PROC3 is in EXE2 mode.

In the sixth stage, the deferred load of location B into register % r0 (from the first execution stage), is replayed in PROC3, and the value is still not present in PROC3's cache. In this situation, a miss request may be issued (block 440) and the request may be fulfilled (block 445) to fill a cache line in PROC3's cache. Since PROC3's cache is filled during EXE2 mode, the Z-bit is set (block 445).

In the seventh stage, the load location B instruction is replayed, and now generates a hit. Because the Z-bit is now set, however, PROC3 now fails speculation in EXE2 mode (block 460). The example pseudocode in TABLE 2 illustrates that PROC3 may continue to speculatively execute load instructions after a fail would occur in conventional systems. But the EXE2 mode still correctly fails the speculation eventually and does not generate bad data values.

The above discussion is meant to be illustrative of the principles and various embodiments of the present invention. Numerous variations and modifications will become apparent once the above disclosure is fully appreciated. For example, the Z-bit discussed above may be implemented as a separate physical bit than the S-bit 116, or in some embodiments, may re-use the S-bit 116 because it is no longer meaningful during EXE2 mode. Also, the data structures and code described in this detailed description may be stored on a computer readable storage medium, which may be any device or medium that can store code and/or data for use by a computer system. This may include, but is not limited to, magnetic and optical storage devices such as disk drives, magnetic tape, compact discs (CDs) and digital video discs (DVDs), and computer instruction signals embodied in a transmission medium. For example, the transmission medium may include a communications network, such as the Internet. The claims should be interpreted to include any and all such variations and modifications. In addition, the above description has broad application, and the discussion of any embodiment is meant only to be exemplary, and is not intended to intimate that the scope of the disclosure, including the claims, is limited to these embodiments.

We claim:
1. A method of executing instructions in a computer system, the method comprising the acts of:
   speculatively executing a first thread of a program code while a second thread of the program code is executing;
   determining if a load request from the first thread is serviceable from a cache line within a cache;
   in the event that the load request is serviceable from the cache line, associating a first indicator bit with the cache line;
   determining if the cache line has been evicted; and
   in the event that the cache line is evicted, allowing speculative execution of the first thread to continue; and
   committing changes to one or more lines of memory that occur in response to the speculative execution, including committing changes to the cache line that occur after the cache line has been evicted.

2. The method of claim 1, whereby in the event that the cache line is evicted, the method further comprises the act of speculatively committing one or more load requests at a time the cache line is evicted.

3. The method of claim 2, wherein the cache is shared between threads.

4. The method of claim 2, further comprising the act of clearing the first indicator bit.

5. The method of claim 4, whereby once the first indicator bit is cleared, the act of determining if the load request is serviceable from the cache line is repeated.

6. The method of claim 5, whereby in the event that the load request is not present in the cache line, the method further comprises the act of issuing a miss request.

7. The method of claim 6, further comprising the act of fulfilling the miss request from a location outside the cache.

8. The method of claim 7, whereby in the event that the miss request is fulfilled from a location outside the cache, associating a secondary indicator bit with the cache line.

9. The method of claim 1, wherein the cache further comprises a secondary indicator bit and the method further comprises the act of determining if the secondary indicator bit is set, and in the event that the secondary indicator bit is set, the method further comprises the act of terminating speculative execution of the first thread.

10. A computer system comprising:
    a plurality of processing cores, each capable of executing at least one thread of program code, wherein each of the cores within the plurality of processing cores comprises:
    a plurality of register files; and
    a cache coupled to the plurality of register files, wherein each cache line within the cache further comprises a first indicator bit;
    wherein a first core within the plurality of processing cores executes a first thread of the program code out-of-order code while a second core within the plurality of processing cores executes a second thread of program code; and
    wherein, in the event that a load request from the first thread hits to a cache line with the first indicator bit set, and that hit cache line is later evicted from the cache, the first thread continues to execute the program code out-of-order and changes to one or more lines of memory that occur in response to the out-of-order execution are committed, including changes to the cache line that occur after the cache line has been evicted.

11. The computer system of claim 10, wherein in the event that the cache line with the first indicator bit set is evicted, then at least one change from the first thread is committed.

12. The computer system of claim 11, wherein the at least one change from the first thread is committed at the conclusion of a speculative execution by the first thread.

13. The computer system of claim 11, wherein the computer system clears the first indicator bit.

14. The computer system of claim 13, wherein once the first indicator bit is cleared, the first thread executes an instruction subsequent to the load request.

15. The computer system of claim 14, wherein in the event that the subsequent instruction is not present in the cache, the thread executes a miss request.

16. The computer system of claim 15, wherein the computer system further comprises a memory coupled to the cache and the miss request is fulfilled from the memory.

17. The computer system of claim 10, cache further comprises a secondary indicator bit, and in the event that the secondary indicator bit is set, the first thread is terminated.

18. A non-transitory storage medium comprising instructions capable of being executed by a computer system, the instructions comprising the acts of:

speculatively executing a first thread of a program code while a second thread of the program code is executing;

determining if a load request from the first thread is serviceable from a cache line within a cache;

in the event that the load request is serviceable from the cache line, associating a first indicator bit with the cache line;

determining if the cache line has been evicted; and in the event that the cache line is evicted, allowing speculative execution of the first thread to continue and committing changes to one or more lines of memory that occur in response to the speculative execution, including committing changes to the cache line that occur after the cache line has been evicted.

19. The non-transitory storage medium of claim 18, whereby in the event that the load request is not present in the cache line, the instructions further comprise the act of issuing a miss request.

20. The non-transitory storage medium of claim 19, the instructions further comprise the act of fulfilling the miss request from a location outside the cache and the instructions further comprise the act of terminating speculative execution of the first thread.

* * * * *

UNITED STATES PATENT AND TRADEMARK OFFICE
CERTIFICATE OF CORRECTION

| | | |
|---|---|---|
| PATENT NO. | : 8,898,401 B2 | Page 1 of 1 |
| APPLICATION NO. | : 12/266753 | |
| DATED | : November 25, 2014 | |
| INVENTOR(S) | : Manovit et al. | |

It is certified that error appears in the above-identified patent and that said Letters Patent is hereby corrected as shown below:

In the Specification

In column 5, line 27, delete "that that" and insert -- that --, therefor.

In column 6, line 37, delete "cacheline" and insert -- cache line --, therefor.

Signed and Sealed this
Fourth Day of August, 2015

Michelle K. Lee
*Director of the United States Patent and Trademark Office*